(12) United States Patent
Groen et al.

(10) Patent No.: US 7,227,375 B2
(45) Date of Patent: Jun. 5, 2007

(54) DAC BASED DRIVER WITH SELECTABLE PRE-EMPHASIS SIGNAL LEVELS

(75) Inventors: Eric D. Groen, Ankeny, IA (US);
Charles W. Boecker, Ames, IA (US);
William C. Black, Ames, IA (US)

(73) Assignee: Xilinx Inc., San Jose, CA (US)

( * ) Notice: Subject to any disclaimer, the term of this patent is extended or adjusted under 35 U.S.C. 154(b) by 0 days.

(21) Appl. No.: 11/218,962

(22) Filed: Sep. 1, 2005

(65) Prior Publication Data

US 2006/0006901 A1   Jan. 12, 2006

Related U.S. Application Data

(63) Continuation of application No. 10/660,062, filed on Sep. 11, 2003, now Pat. No. 6,975,132.

(51) Int. Cl.
*H03K 19/003* (2006.01)
*H03K 19/0175* (2006.01)

(52) U.S. Cl. .................... 326/27; 326/86; 327/108

(58) Field of Classification Search ............. 326/83, 326/86, 87; 327/108
See application file for complete search history.

(56) References Cited

U.S. PATENT DOCUMENTS

| | | | |
|---|---|---|---|
| 5,391,939 A * | 2/1995 | Nonaka | 326/83 |
| 5,517,129 A | 5/1996 | Matsui | |
| 5,777,944 A | 7/1998 | Knaack et al. | |
| 6,125,415 A | 9/2000 | Liu | |
| 6,265,920 B1 * | 7/2001 | Gauthier | 327/166 |
| 6,518,792 B2 * | 2/2003 | Jong et al. | 326/87 |
| 6,870,390 B1 | 3/2005 | Groen et al. | |
| 6,940,302 B1 * | 9/2005 | Shumarayev et al. | 326/26 |
| 2002/0125933 A1 | 9/2002 | Gotoh et al. | |
| 2002/0186048 A1 | 12/2002 | Pierson et al. | |

OTHER PUBLICATIONS

U.S. Appl. No. 10/659,803, filed Sep. 11, 2003, Black et al.
U.S. Appl. No. 10/659,971, filed Sep. 11, 2003, Broecker et al.

* cited by examiner

*Primary Examiner*—Daniel Chang
(74) *Attorney, Agent, or Firm*—Kim Kanzaki; Michael T. Wallace; Justin Liu

(57) ABSTRACT

A Transmit line driver with selectable pre-emphasis and driver signal magnitudes comprises a primary current driver for setting a primary current level and a pre-emphasis current driver that provides an additional amount of current that is superimposed with or added to the primary current level produced by the primary current driver. The pre-emphasis current has either negative or positive magnitude based upon a pre-emphasis signal logic state. A first current selection module defines a reference signal that is used to select the primary current driver output signal magnitude in a first current mirror, while a second current selection module is used to define a second reference signal that selects a pre-emphasis current driver signal magnitude in a second current mirror. Logic generates a binary signal to both the first and second current selection modules to select the current levels as well as the pre-emphasis signal.

11 Claims, 11 Drawing Sheets programmable logic device 10 programmable multi-gigabit transceivers 14 – 28

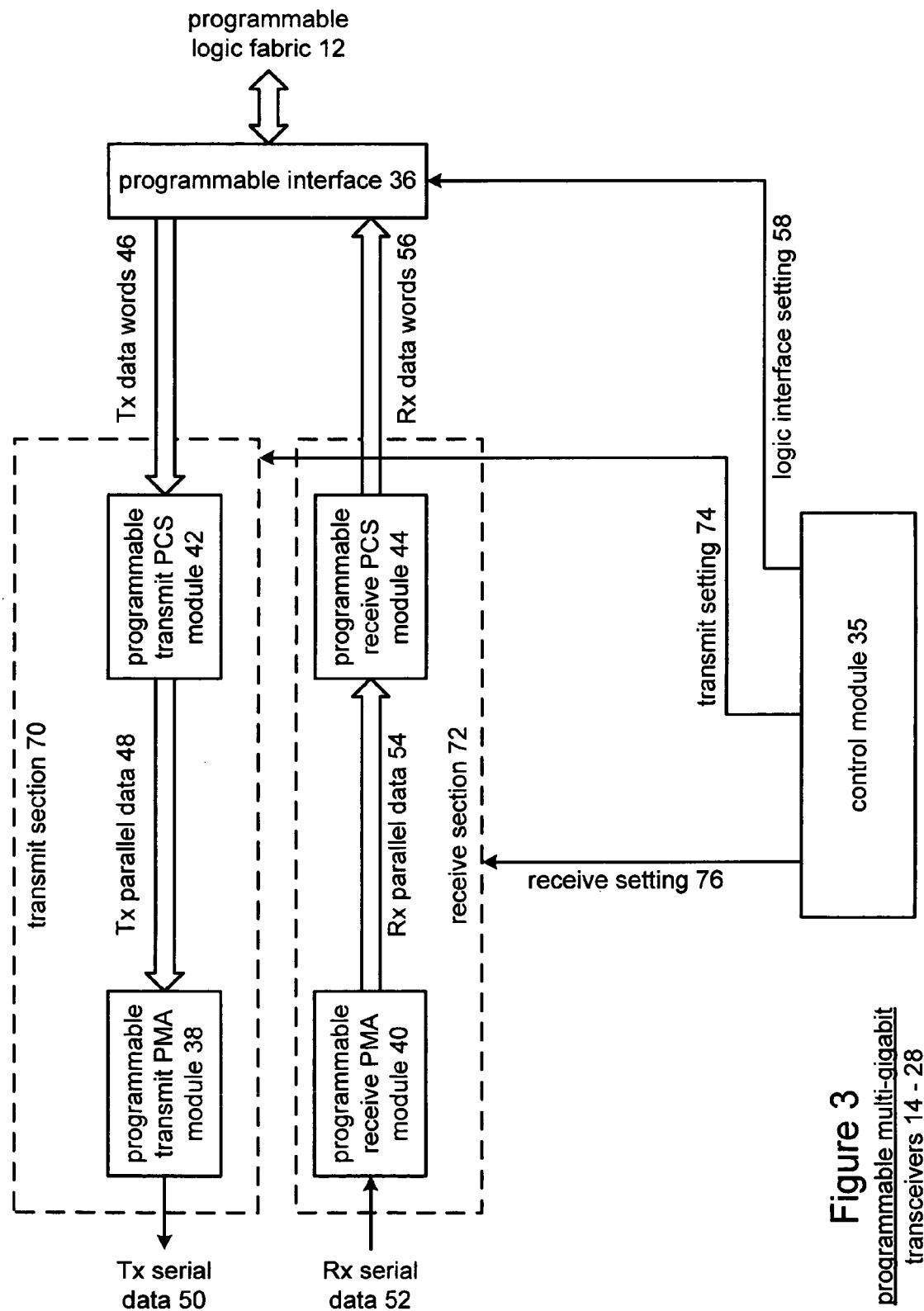

programmable receive PMA module 40 programmable transmit PMA module 38

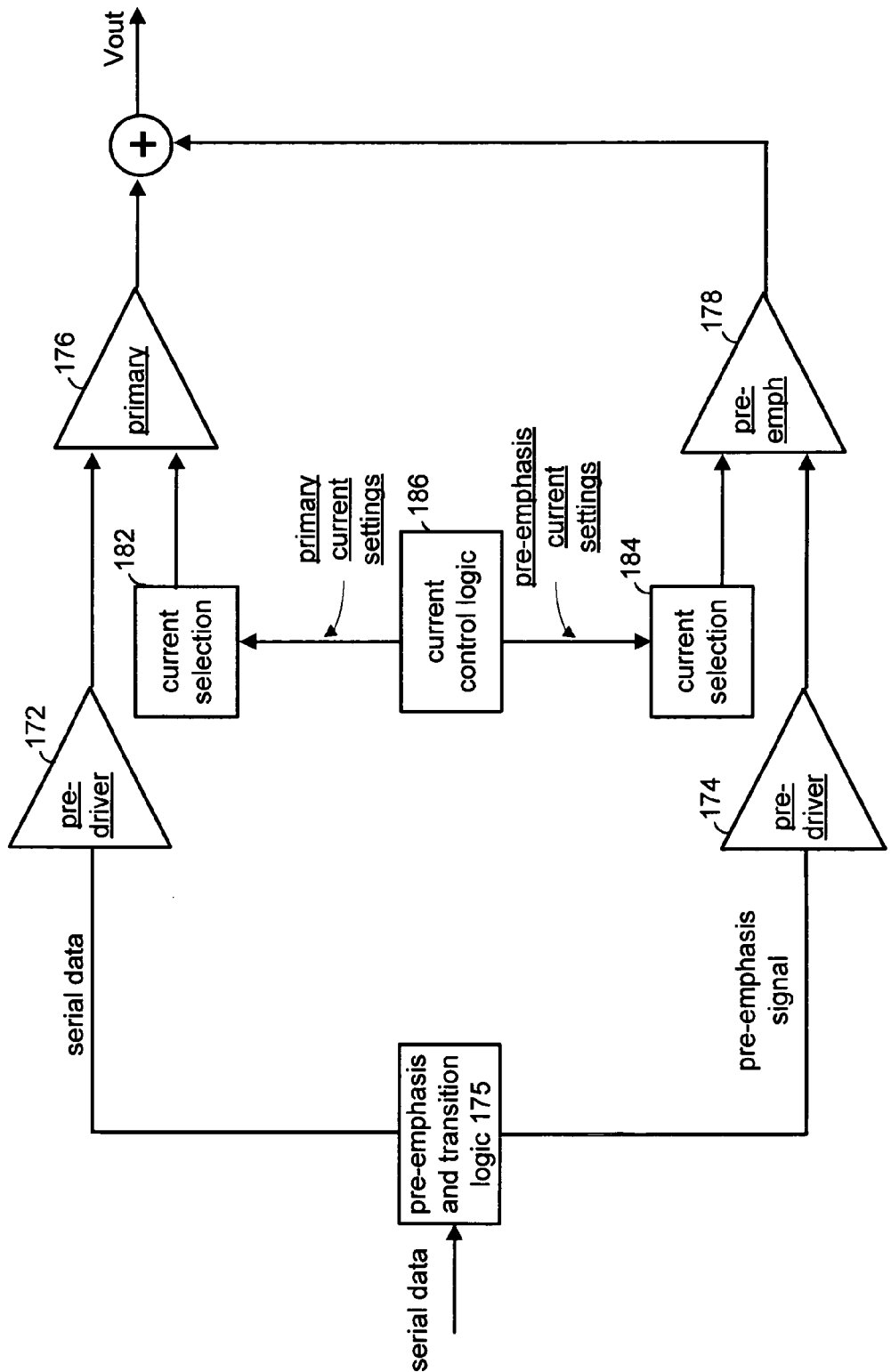
Figure 5  Tx line driver 170

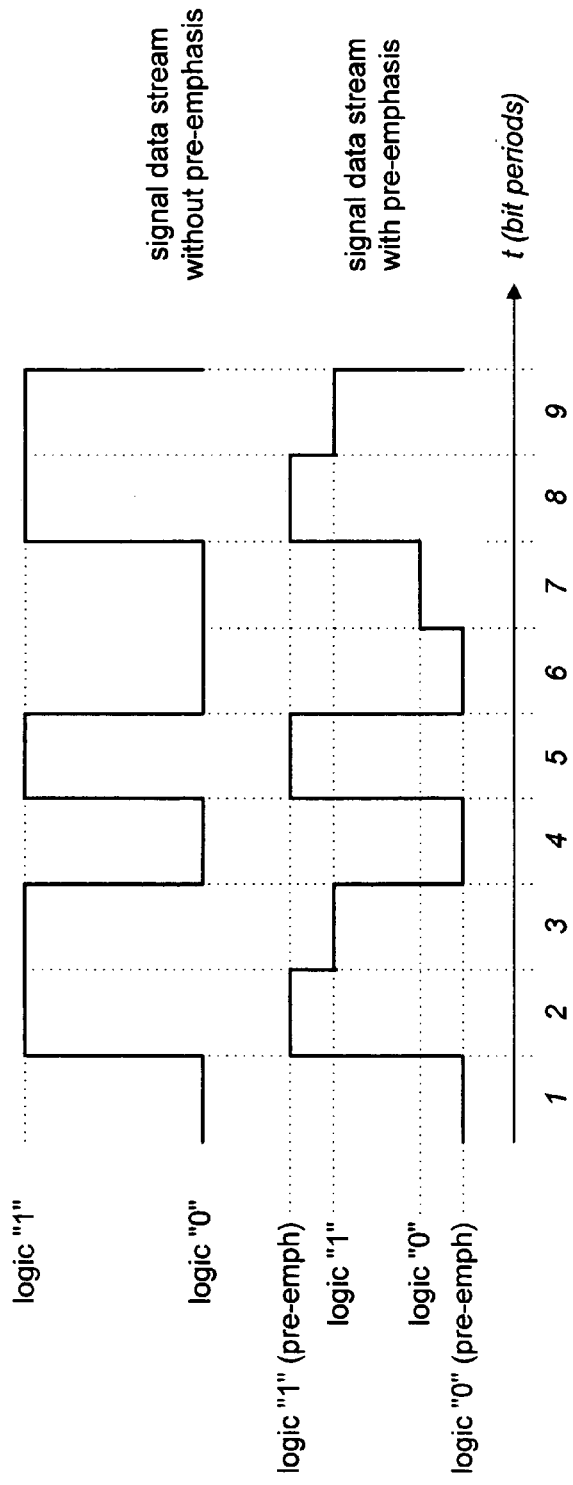
Figure 6 signal diagrams
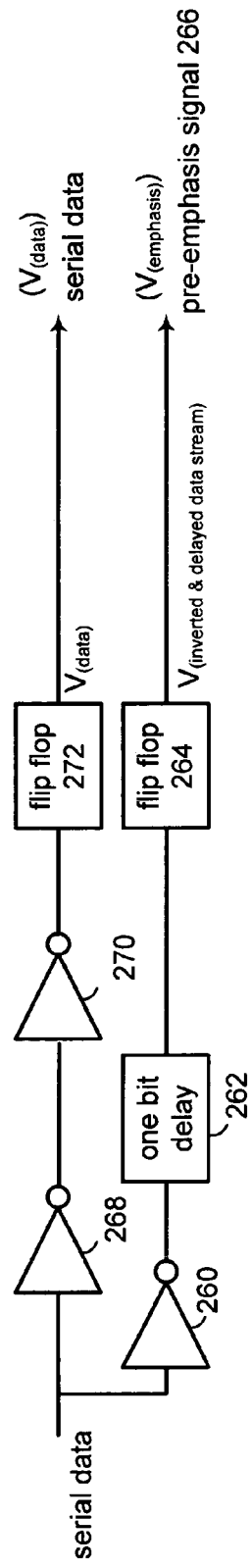
Figure 9 pre-emphasis and transition logic 175

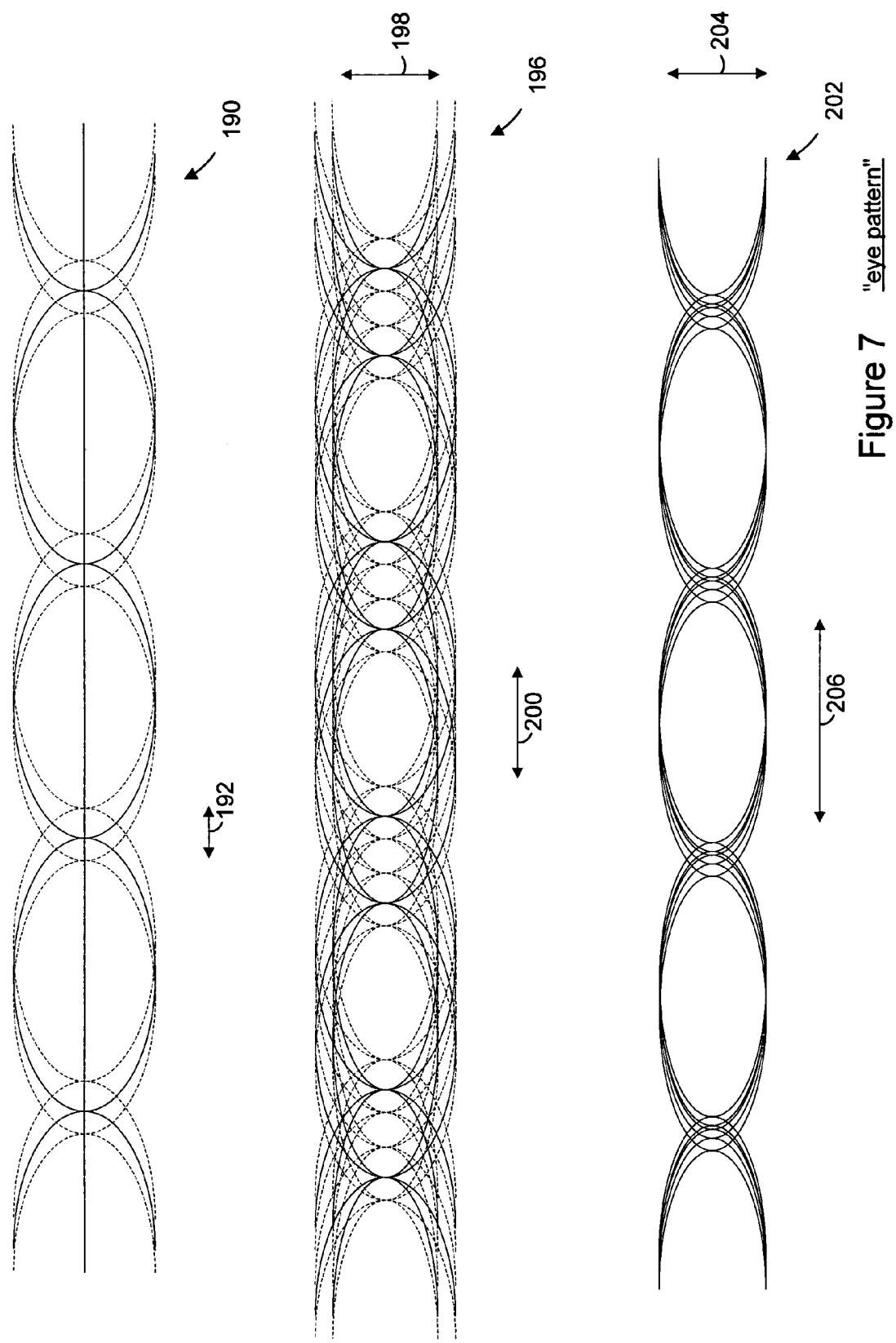
Figure 7 "eye pattern"

Figure 10A truth table for transitions to logic one

Figure 10B truth table for all transitions

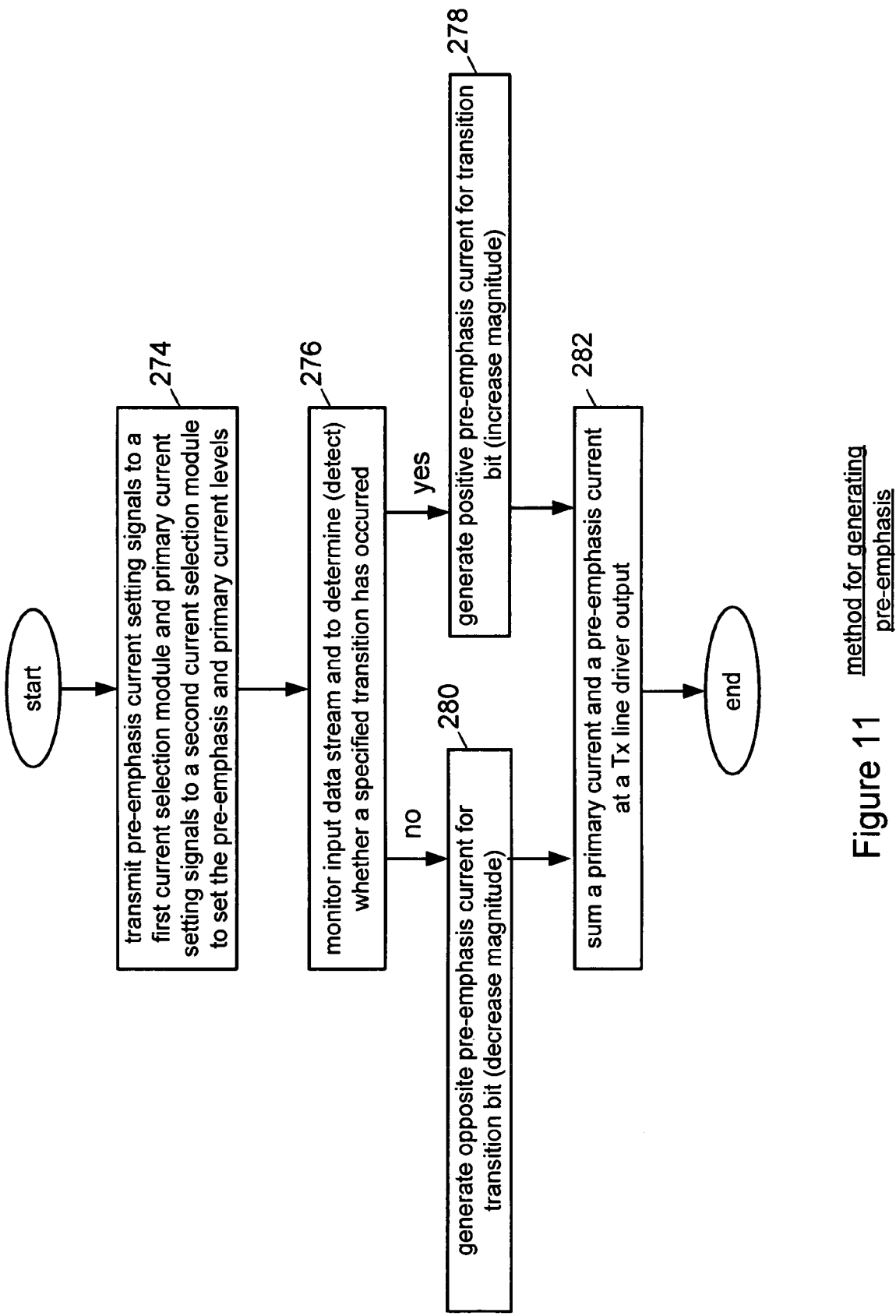
Figure 11  method for generating pre-emphasis

DAC BASED DRIVER WITH SELECTABLE PRE-EMPHASIS SIGNAL LEVELS

BACKGROUND OF THE INVENTION

1. Technical Field of the Invention

This invention relates generally to communication systems and more particularly to line driver circuits used therein.

2. Description of Related Art

Communication systems are known to transport large amounts of data between a plurality of end user devices, which, for example, include telephones, facsimile machines, computers, television sets, cellular telephones, personal digital assistants, etc. As is also known, such communication systems may be local area networks (LANs) and/or wide area networks (WANs) that are stand-alone communication systems or interconnected to other LANs and/or WANs as part of a public switched telephone network (PSTN), packet switched data network (PSDN), integrated service digital network (ISDN), or Internet. As is further known, communication systems include a plurality of system equipment to facilitate the transporting of data. Such system equipment includes, but is not limited to, routers, switches, bridges, gateways, protocol converters, frame relays, private branch exchanges, etc.

The transportation of data within communication systems is governed by one or more standards that ensure the integrity of data conveyances and fairness of access for data conveyances. For example, there are a variety of Ethernet standards that govern serial transmissions within a communication system at data rates of 10 megabits per second, 100 megabits per second, 1 gigabit per second and beyond. Synchronous Optical NETwork (SONET), for example, requires 10 gigabits per second. In accordance with such standards, many system components and end user devices of a communication system transport data via serial transmission paths. Internally, however, the system components and end user devices process data in a parallel manner. As such, each system component and end user device must receive the serial data and convert the serial data into parallel data without loss of information.

Accurate recovery of information from high-speed serial transmissions typically requires transceiver components that operate at clock speeds equal to or higher than the received serial data rate. Higher clock speeds limit the usefulness of prior art clock recovery circuits that require precise alignment of signals to recover clock and/or data. Higher data rates require greater bandwidth for a feedback loop of the recovery circuits to operate correctly according to one embodiment of the invention. Some prior art designs are bandwidth limited.

As the demand for data throughput increases, so do the demands on a high-speed serial transceiver. The increased throughput demands are pushing some current integrated circuit manufacturing processes to their operating limits, where integrated circuit processing limits (e.g., device parasitics, trace sizes, propagation delays, device sizes, etc.) and integrated circuit (IC) fabrication limits (e.g., IC layout, frequency response of the packaging, frequency response of bonding wires, etc.) limit the speed at which the high-speed serial transceiver may operate without excessive jitter performance and/or noise performance.

A further alternative for high-speed serial transceivers is to use an IC technology that inherently provides for greater speeds. For instance, switching from a Complementary Metal Oxide Semiconductor (CMOS) process to a silicon germanium or gallium arsenide process would allow integrated circuit transceivers to operate at greater speeds, but at substantially increased manufacturing costs. CMOS is more cost effective and provides easier system integration. Currently, for most commercial-grade applications, including communication systems, such alternate integrated circuit fabrication processes are too cost prohibitive for wide spread use.

Modern communication systems, including high data rate communication systems, typically include a plurality of circuit boards that communicate with each other by way of signal traces, bundled data lines, back planes, etc. Accordingly, designers of high data rate communication transceiver devices often have conflicting design goals that relate to the performance of the particular device. For example, there are many different communication protocols specified for data rates that range from 2.48832 gigabits per second for OC48, to 9.95 gigabits per second for OC192. Other known standards define data rates of 2.5 gigabits per second (INFINIBAND) or 3.125 gigabits per second (XAUI). These different data rates affect the allowable rise and fall time of the signal, the peak amplitude of the signal and the response time from an idle state. For example, one protocol may specify a peak voltage range of 200–400 millivolts, while another standard specifies a mutually exclusive voltage range of 500–700 millivolts. Thus, a designer either cannot satisfy these mutually exclusive requirements or must design a high data rate transceiver device that can adapt according to the protocol being used for the communications.

Along these lines, field programmable gate array (FPGA) circuits are gaining in popularity for providing the required flexibility and adaptable performance described above for those designers that seek to build one device that can operate according to multiple protocols. Thus, while FPGA technology affords a designer an opportunity to develop flexible and configurable hardware circuits, specific designs that achieve the desired operations must still be developed.

One design challenge for high data rate communications relates to the physical media of the communications. For example, for high data rate communications, long printed circuit board (PCB) traces and communication lines through one or more connectors are known to seriously degrade signal magnitude and quality. Among other factors, not only is the signal magnitude degraded, but also the relative signal timing. The crossing point of a signal shifts thereby affecting the timing of its' proper detection and interpretation. Accordingly, it is desirable to produce circuits that counteract the aforementioned channel frequency response and associated affects to restore a signal.

BRIEF SUMMARY OF THE INVENTION

A transmit (Tx) line driver with selectable pre-emphasis and driver signal magnitudes comprises a primary current driver for setting a primary current level and a pre-emphasis current driver that provides an additional amount of current that is superimposed with or added to the primary current level produced by the primary current driver. A first current selection module defines a reference signal that is used to set the primary current driver output signal magnitude in a first current mirror, while a second current selection module is used to define a second reference signal that selects a pre-emphasis current driver signal magnitude in a second current mirror that is to be superimposed with the primary current signal magnitude produced by the primary current driver. A current control logic block generates a binary signal to both the first and second current selection modules to select the corresponding current levels. Additionally, the current control logic block is coupled to receive an input data stream and to transmit a pre-emphasis control signal whenever a transition has occurred in the input data stream. Thus, the current selection module for the pre-emphasis current driver provides a reference current to (activate) the pre-emphasis current driver only so long as the pre-emphasis control signal is received from the current control logic block.

Each of the current selection modules for the primary current driver and the pre-emphasis current driver comprises a plurality of scaled MOSFET devices that produce differing magnitudes of current flow. The scaled devices are selectable and are selected in response to a binary signal received from the current control logic block. Accordingly, in response to transmission channel conditions, both the primary current level and the pre-emphasis current level produced by the primary current driver and the pre-emphasis current driver, respectively, may be selected.

BRIEF DESCRIPTION OF THE DRAWINGS

FIG. 3 illustrates an alternate schematic block diagram representing one of the programmable multi-gigabit transceivers;

FIG. 5 is a functional block diagram of a Tx line driver formed according to one embodiment of the present invention;

FIG. 6 is a signal diagram illustrating a signal without pre-emphasis and a signal with pre-emphasis;

FIG. 7 illustrates a signal data stream in a communication channel with and without pre-emphasis;

FIG. 9 illustrates pre-emphasis and transition logic for determining and generating a pre-emphasis control signal as well as a synchronized serial data stream;

FIGS. 10A and 10B illustrate circuitry and a truth table relating to a method for determining and generating a pre-emphasis control signal; and FIG. 11 is a flowchart illustrating a method for generating a pre-emphasis current.

DETAILED DESCRIPTION OF THE INVENTION

Figure 1:
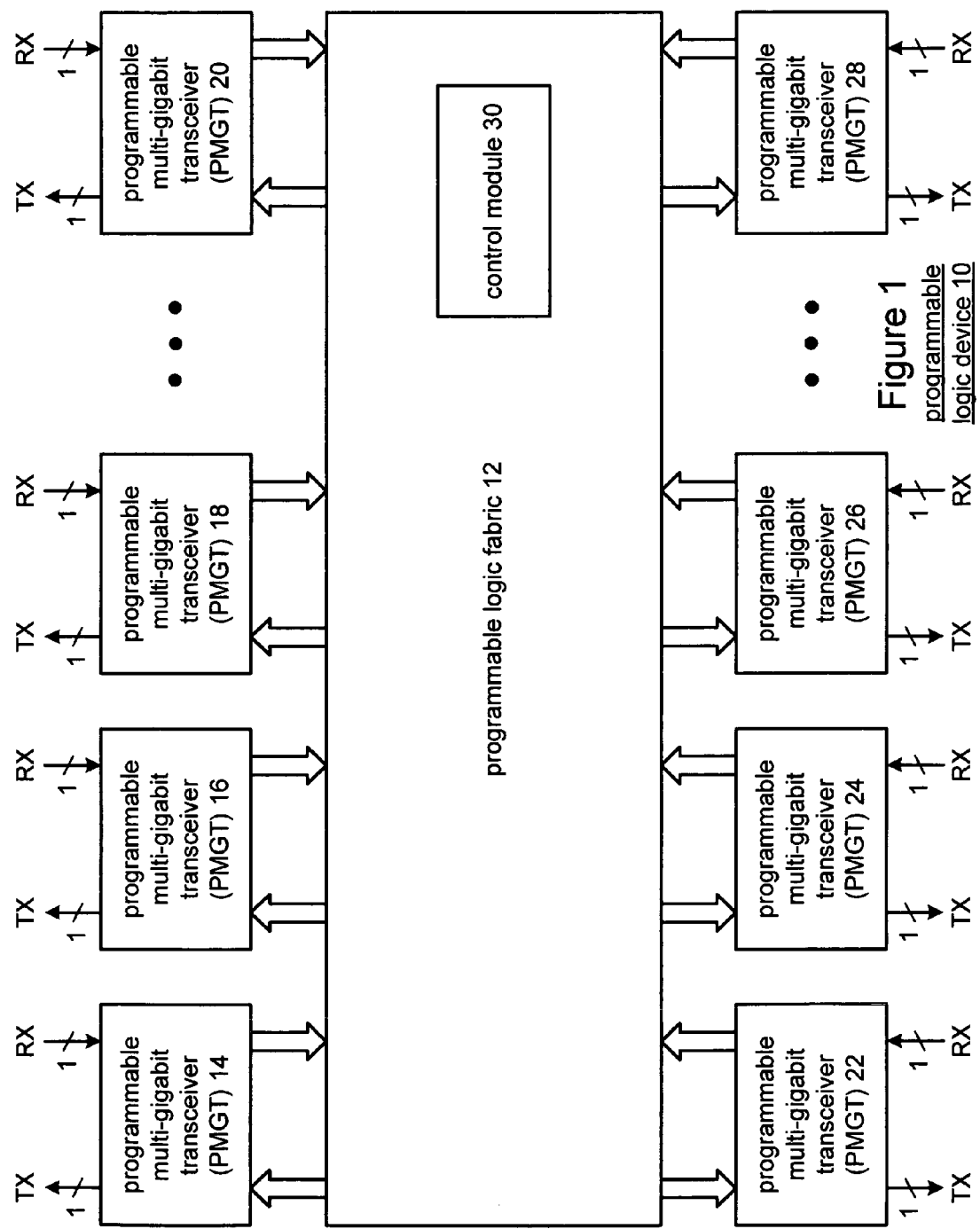
FIG. 1 is a schematic block diagram of a programmable logic device that includes programmable logic fabric, a plurality of programmable multi-gigabit transceivers (PMGTs) and a control module.

FIG. 1 is a schematic block diagram of a programmable logic device 10 that includes programmable logic fabric 12, a plurality of programmable multi-gigabit transceivers (PMGTs) 14–28 and a control module 30. The programmable logic device 10 may be a programmable logic array device, a programmable array logic device, an erasable programmable logic device, and/or a field programmable gate array (FPGA). When the programmable logic device 10 is an FPGA, the programmable logic fabric 12 may be implemented as a symmetric array configuration, a row-based configuration, a sea-of-gates configuration, and/or a hierarchical programmable logic device configuration. The programmable logic fabric 12 may further include at least one dedicated fixed processor, such as a microprocessor core, to further facilitate the programmable flexibility offered by programmable logic device 10.

The control module 30 may be contained within the programmable logic fabric 12 or it may be a separate module. In either implementation, the control module 30 generates the control signals to program each of the transmit and receive sections of the programmable multi-gigabit transceivers 14–28. In general, each of the programmable multi-gigabit transceivers 14–28 performs a serial-to-parallel conversion on received data and performs a parallel-to-serial conversion on transmit data. The parallel data may be 8-bits, 16-bits, 32-bits, 64-bits, etc., wide.

Typically, the serial data will be a 1-bit stream of data that may be a binary level signal, multi-level signal, etc. Further, two or more programmable multi-gigabit transceivers may be bonded together to provide greater transmitting speeds. For example, if PMGTs 14, 16 and 18 are transceiving data at 3.125 gigabits-per-second, the PMGTs 14–18 may be bonded together such that the effective serial rate is 3 times 3.125 gigabits-per-second.

Each of the programmable multi-gigabit transceivers 14–28 may be individually programmed to conform to separate standards. In addition, the transmit path and receive path of each programmable multi-gigabit transceivers 14–28 may be separately programmed such that the transmit path of a transceiver is supporting one standard while the receive path of the same transceiver is supporting a different standard. Further, the serial rates of the transmit path and receive path may be programmed from 1 gigabit-per-second to tens of gigabits-per-second. The size of the parallel data in the transmit and receive sections, or paths, is also programmable and may vary from 8-bits, 16-bits, 32-bits, 64-bits, etc.

Figure 2:
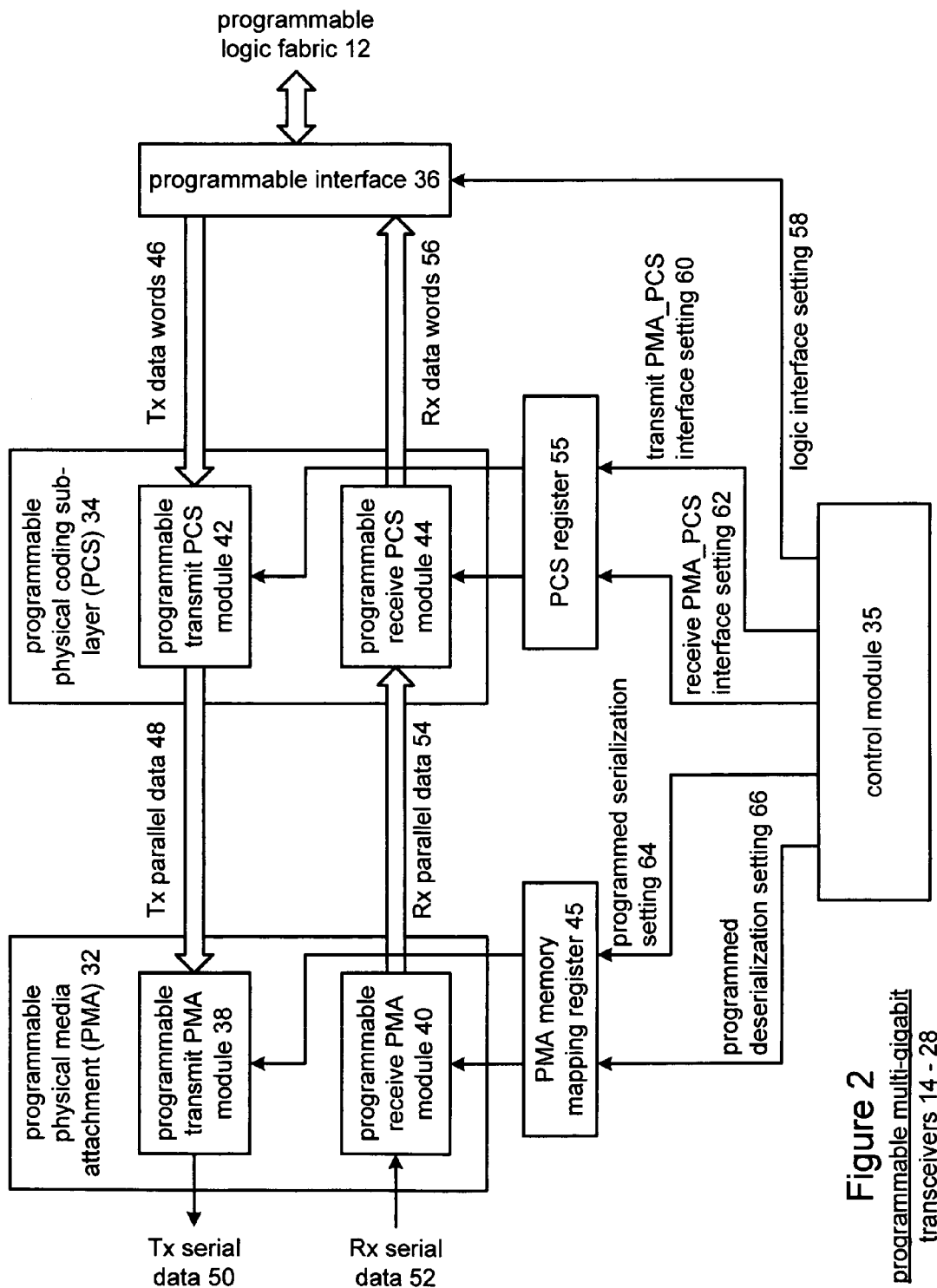
FIG. 2 is a schematic block diagram of one embodiment representing one of the programmable multi-gigabit transceivers.

FIG. 2 is a schematic block diagram of one embodiment representing one of the programmable multi-gigabit transceivers 14–28. As shown, the programmable multi-gigabit transceiver includes a programmable physical media attachment (PMA) module 32, a programmable physical coding sub-layer (PCS) module 34, a programmable interface 36, a control module 35, a PMA memory mapping register 45 and a PCS register 55. The control module 35, based on the desired mode of operation for the individual programmable multi-gigabit transceiver 14–28, generates a programmed deserialization setting 66, a programmed serialization setting 64, a receive PMA_PCS interface setting 62, a transmit PMA_PCS interface setting 60, and a logic interface setting 58. The control module 35 may be a separate device within each of the programmable multi-gigabit transceivers and/or included within the control module 30 of FIG. 1. In either embodiment of the PMGT control module 35, the programmable logic device control module 30 determines the corresponding overall desired operating conditions for the programmable logic device 10 and provides the corresponding operating parameters for a given programmable multi-gigabit transceiver to its control module 35, which generates the settings 58–66.

The programmable physical media attachment (PMA) module 32 includes a programmable transmit PMA module 38 and a programmable receive PMA module 40. The programmable transmit PMA module 38, which will be described in greater detail with reference to FIG. 4B, is operably coupled to convert transmit parallel data 48 into transmit serial data 50 in accordance with the programmed serialization setting 64. The programmed serialization setting 64 indicates the desired rate of the transmit serial data 50, the desired rate of the transmit parallel data 48, and the data width of the transmit parallel data 48. The programmable receive PMA module 40 is operably coupled to convert receive serial data 52 into receive parallel data 54 based on the programmed deserialization setting 66. The programmed deserialization setting 66 indicates the rate of the receive serial data 52, the desired rate of the receive parallel data 54, and the data width of the receive parallel data 54. The PMA memory mapping register 45 may store the programmed serialization setting 64 and the programmed deserialization setting 66.

The programmable physical coding sub-layer (PCS) module 34 includes a programmable transmit PCS module 42 and a programmable receive PCS module 44. The programmable transmit PCS module 42 receives transmit data words 46 from the programmable logic fabric 12 (of FIG. 1) via the programmable interface 36 and converts them into the transmit parallel data 48 in accordance with the transmit PMA_PCS interface setting 60. The transmit PMA_PCS interface setting 60 indicates the rate of the transmit data words 46, the size of the transmit data words (e.g., 1-byte, 2-bytes, 3-bytes, 4-bytes, etc.) and the corresponding transmission rate of the transmit parallel data 48. The programmable receive PCS module 44 converts the received parallel data 54 into receive data words 56 in accordance with the receive PMA_PCS interface setting 62. The receive PMA_PCS interface setting 62 indicates the rate at which the receive parallel data 54 will be received, the width of the receive parallel data 54, the transmit rate of the receive data words 56 and the word size of the receive data words 56.

The control module 35 also generates the logic interface setting 58 that provides the rates at which the transmit data words 46 and receive data words 56 will be transceived with the programmable logic fabric 12 (of FIG. 1). Note that the transmit data words 46 may be received from the programmable logic fabric 12 at a different rate than the receive data words 56 are provided to the programmable logic fabric 12.

As one of average skill in the art will appreciate, each of the modules within the programmable PMA 32 and programmable PCS 34 may be individually programmed to support a desired data transfer rate. The data transfer rate may be in accordance with a particular standard such that the receive path, i.e., the programmable receive PMA module 40 and the programmable receive PCS module 44 may be programmed in accordance with one standard, while the transmit path, i.e., the programmable transmit PCS module 42 and the programmable transmit PMA module 38 may be programmed in accordance with another standard.

FIG. 3 illustrates an alternate schematic block diagram representing one of the programmable multi-gigabit transceivers 14–28. In this embodiment, the programmable multi-gigabit transceiver 14–28 include a transmit section 70, a receive section 72, the control module 35 and the programmable interface 36. The transmit section 70 includes the programmable transmit PMA module 38 and the programmable transmit PCS module 42. The receive section 72 includes the programmable receive PMA module 40 and the programmable receive PCS module 44.

In this embodiment, the control module 35 separately programs the transmit section and the receive section via transmit setting 74 and receive setting 76, respectively. The control module 35 also programs the programmable interface 36 via the logic interface setting 58. Accordingly, the control module 35 may program the receive section 72 to function in accordance with one standard while programming the transmit section 70 in accordance with another standard. Further, the logic interface setting 58 may indicate that the transmit data words 46 are received from the programmable logic fabric 12 at a different rate than the receive data words 56 are provided to the programmable logic fabric 12. As one of average skill in the art will appreciate, the programmable interface 36 may include a transmit buffer and a receive buffer, and/or an elastic store buffer to facilitate the providing and receiving of the transmit data words 46 and receive data words 56 to and from the programmable logic fabric 12.

Figure 4A:
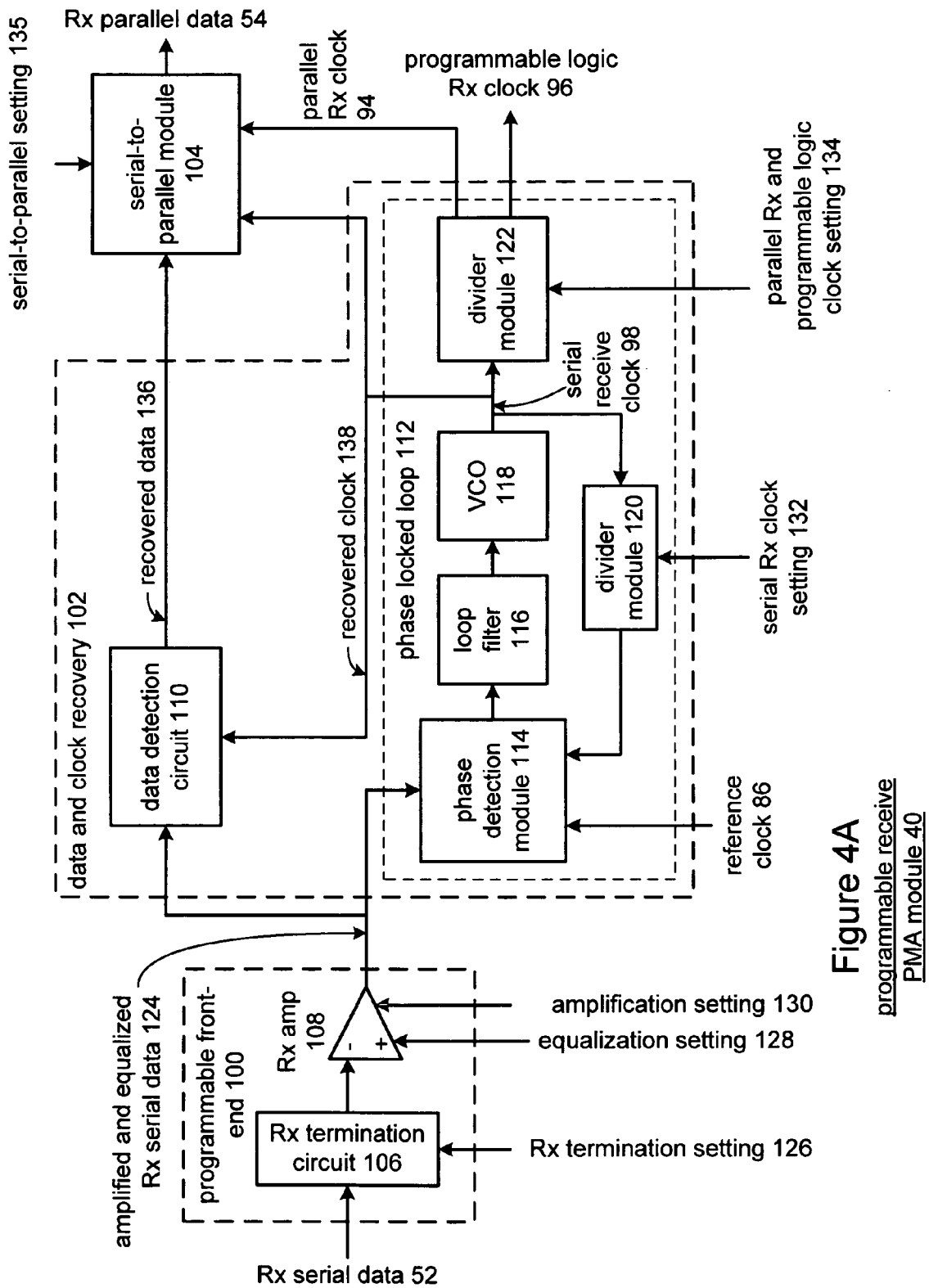
FIG. 4A illustrates a schematic block diagram of a programmable receive PMA module that includes a programmable front-end, a data and clock recovery module, and a serial-to-parallel module.
Figure 4B:
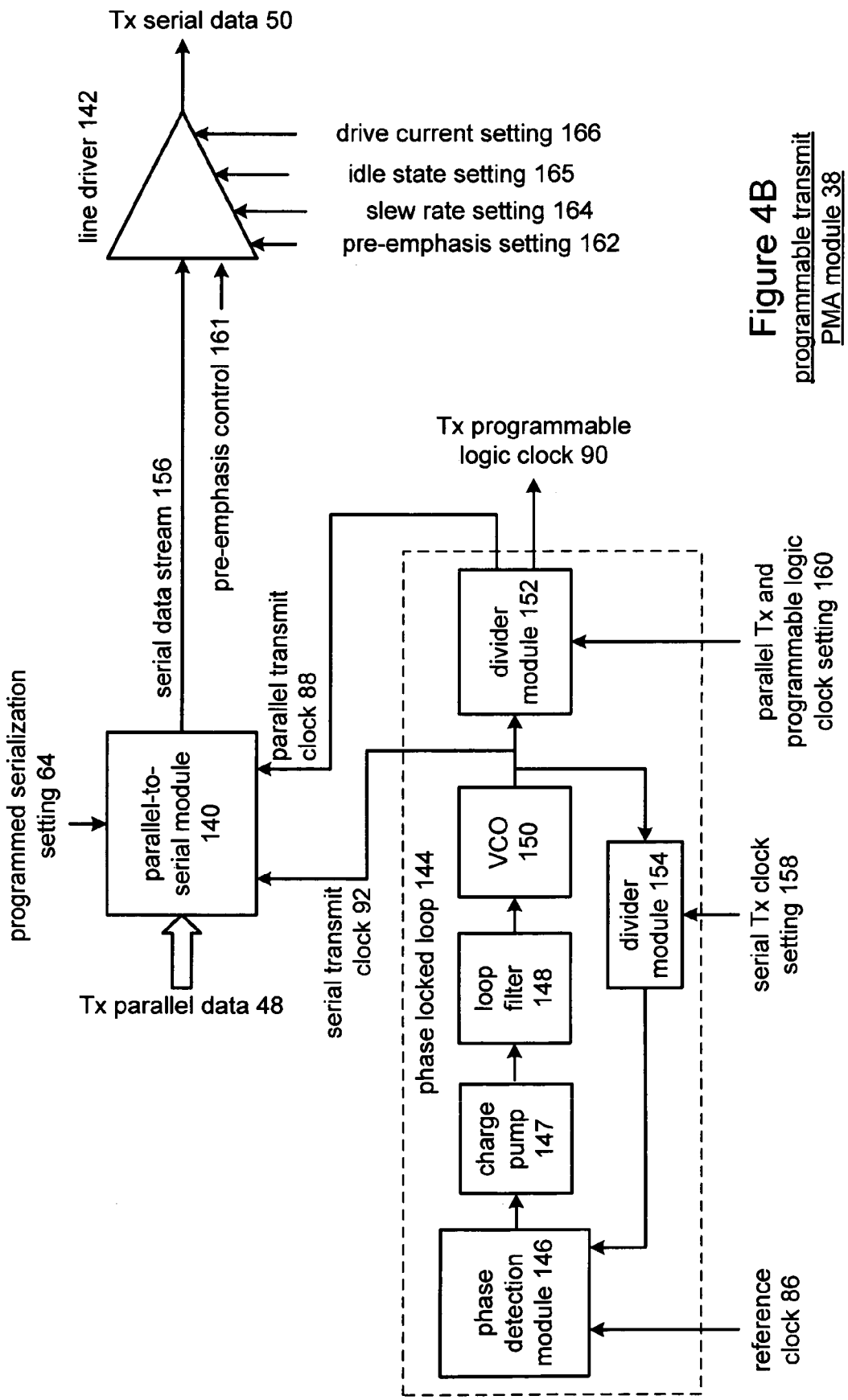
FIG. 4B illustrates a schematic block diagram of a programmable transmit PMA module that includes a phase locked loop, a parallel-to-serial module, and line driver.

FIG. 4A illustrates a schematic block diagram of the programmable receive PMA module 40 that includes a programmable front-end 100, a data and clock recovery module 102, and a serial-to-parallel module 104. The programmable front-end 100 includes a receive termination circuit 106 and a receive amplifier 108. The data and clock recovery module 102 includes a data detection circuit 110 and a phase locked loop 112. The phase locked loop 112 includes a phase detection module 114, a loop filter 116, a voltage controlled oscillator (VCO) 118, a $1^{st}$ divider module 120, and a $2^{nd}$ divider module 122.

The programmable front-end 100 is operably coupled to receive the receive serial data 52 and produce amplified and equalized receive serial data 124 therefrom. To achieve this, the receive termination circuit 106 is programmed in accordance with a receive termination setting 126 to provide the appropriate termination for the transmission line between the programmable receive PMA module 40 and the source that originally transmitted the receive serial data 52. The receive termination setting 126 may indicate whether the receive serial data 52 is a single-ended signal, a differential signal, may indicate the impedance of the termination line, and may indicate the biasing of the receive termination circuit 106. For a more detailed discussion of the receiver termination circuit 106 refer to co-pending patent application entitled RECEIVER TERMINATION NETWORK AND APPLICATION THEREOF, by Charles W. Boecker et al., and having the same filing date as the present application and which is herein incorporated by reference.

The receive termination circuit 106 further biases the receive serial data 52 and provides the bias adjusted signal to the receive amplifier 108. The gain and equalization settings of the receive amplifier 108 may be adjusted in accordance with the equalization setting 128 and the amplification setting 130, respectively. The receive amplifier 108 may be further described in co-pending patent application entitled ANALOG FRONT-END HAVING BUILT-IN EQUALIZATION AND APPLICATIONS THEREOF, by William C. Black et al., and a filing date the same as the present patent application and which is herein incorporated by reference. Note that the receive termination setting 126, the equalization setting 128, and the amplification setting 130 are part of the programmed deserialization setting 66 provided by the control module 35.

The data and clock recovery module 102 receives the amplified and equalized receive serial data 124 via the phase detection module 114 of phase locked loop 112 and via the data detection circuit 110. The phase detection module 114 has been initialized prior to receiving the amplified and equalized receive serial data 124 by comparing the phase and/or frequency of a reference clock 86 with a feedback reference clock produced by divider module 120. Based on this phase and/or frequency difference, the phase detection module 114 produces a corresponding current that is provided to loop filter 116. The loop filter 116 converts the current into a control voltage that adjusts the output frequency of the VCO 118. The divider module 120, based on a serial receive clock setting 132, divides the output oscillation produced by the VCO 118 to produce the feedback signal. Once the amplified and equalized receive serial data 124 is received, the phase detection module 114 compares the phase of the amplified and equalized receive serial data 124 with the phase of the amplified and equalized receive serial data 124. Based on a phase difference between the amplified and equalized receive serial data 124 and the feedback signal, a current signal is produced.

The phase detection module 114 provides the current signal to the loop filter 116, which converts it into a control voltage that controls the output frequency of the VCO 118. At this point, the output of the VCO 118 corresponds to a recovered clock 138. The recovered clock 138, which was referenced as the serial receive clock 98 in FIG. 4, is provided to the divider module 122, the data detection circuit 110 and to the serial-to-parallel module 104. The data detection circuit 110 utilizes the recovered clock 138 to produce recovered data 136 from the amplified and equalized receive serial data 124. The divider module 122 divides the recovered clock 138, in accordance with a parallel receive and programmable logic clock setting 134, to produce a parallel receive clock 94 and a programmable logic receive clock 96. Note that the serial receive clock setting 132 and the parallel receive and programmable logic clock setting 134 are part of the programmed deserialization setting 66 provided to the programmable receive PMA module 40 by the control module 35.

The serial-to-parallel module 104, which may include an elastic store buffer, receives the recovered data 136 at a serial rate in accordance with the recovered clock 138. Based on a serial-to-parallel setting 135 and the parallel receive clock 94, the serial-to-parallel module 104 outputs the receive parallel data 54. The serial-to-parallel setting 135, which may be part of the programmed deserialization setting 66, indicates the rate and data width of the receive parallel data 54.

FIG. 4B illustrates a schematic block diagram of a programmable transmit PMA module 38 that includes a phase locked loop 144, a parallel-to-serial module 140, and a line driver 142. The phase locked loop 144 includes a phase detection module 146, a charge pump 147, a loop filter 148, a voltage control oscillator (VCO) 150, a divider module 154, and a divider module 152.

The phase detection module 146 compares the phase and/or frequency of the reference clock 86 with the phase and/or frequency of a feedback oscillation produced by divider module 154. The phase detection module 146 generates control signals to charge pump 147 which, in turn, produces a current signal to represent the phase and/or frequency difference between the reference clock 86 and the feedback oscillation in one embodiment of the invention. The loop filter 148 converts the current signal into a control voltage that regulates the output oscillation produced by the VCO 150. Divider module 154, based on a serial transmit clock setting 158, divides the output oscillation of the VCO 150, which corresponds to a serial transmit clock 92, to produce the feedback oscillation. Note that the serial transmit clock setting 158 may be part of the programmed serialization setting 64 provided to the programmable transmit PMA module 38 by the control module 35.

Divider module 152 receives the serial transmit clock 92 and, based on a parallel transmit and programmable logic clock setting 160, produces a parallel transmit clock 88 and a transmit programmable logic clock 90. The parallel transmit and programmable logic clock setting 160 may be part of the programmed serialization setting 64.

The parallel-to-serial module 140 receives the transmit parallel data 48 and produces therefrom a serial data stream 156. To facilitate the parallel-to-serial conversion, the parallel-to-serial module 140, which may include an elastic stored buffer, receives a parallel-to-serial setting to indicate the width of the transmit parallel data 48 and the rate of the transmit parallel data, which corresponds to the parallel transmit clock 88. Based on the parallel-to-serial setting, the serial transmit clock 92 and the parallel transmit clock 88, the parallel-to-serial module 140 produces the serial data stream 156 from the transmit parallel data 48.

The line driver 142 increases the power of the serial data stream 156 to produce the transmit serial data 50. The line driver 142 (which is described in greater detail in co-pending patent application, titled "TX LINE DRIVER WITH COMMON MODE IDLE STATE AND SELECTABLE SLEW RATES", by Eric D. Groen, et. al., with a filing date the same as the present patent application, and which is herein incorporated by reference) may be programmed to adjust its pre-emphasis settings, slew rate settings, and primary current drive settings via a pre-emphasis control signal 161, a pre-emphasis setting signal 162, a slew rate setting signal 164, an idle state setting signal 165 and a primary current setting 166. The pre-emphasis control signal 161, pre-emphasis setting signal 162, the slew rate setting signal 164, the idle state setting 165 and the primary current setting 166 may be part of the programmed serialization setting 64. As one of average skill in the art will appreciate, while the diagram of FIG. 4B is shown as a single-ended system, the entire system may be differential signaling and/or a combination of differential and single-ended signaling.

FIG. 5 is a functional block diagram of a Tx line driver formed according to one embodiment of the present invention. Referring to FIG. 5, a Tx line driver 170 includes a pair of pre-drivers 172 and 174. Pre-driver 172 is coupled to receive serial data from pre-emphasis and transition logic 175 while pre-driver 174 is coupled to receive a synchronized pre-emphasis signal from pre-emphasis and transition logic 175. An output of pre-driver 172 is coupled to an input of a primary current driver 176, while an output of pre-driver 174 is coupled to an input of pre-emphasis current driver 178. The outputs of primary current driver 176 and pre-emphasis current driver 178 are produced to a common node 180 where they are summed and output from Tx line driver 170.

Tx line driver 170 further includes a pair of current selection modules 182 and 184 that define current levels produced by primary current driver 176 and pre-emphasis current driver 178, respectively. Current control logic block 186 is coupled to produce primary current settings to current selection module 182 and pre-emphasis current settings to current selection module 184 to define the current levels that are produced by primary current driver 176 and pre-emphasis current driver 178, respectively.

Generally, the embodiments of the invention that include a current control logic block for setting output current levels of the primary and pre-emphasis current drivers 176 and 178, respectively, are advantageous in that they allow for a large combination of different pre-emphasis current level settings in relation to primary current level settings. According to particular channel conditions, allowing for individual adjustment of the primary and pre-emphasis current levels will allow one to maximize a pre-emphasis and primary current setting to produce a signal at the end of a communication channel that may readily be sensed and interpreted for high data rate serial data streams.

The operation of the Tx line driver 170 may be better understood with an explanation of pre-emphasis. FIG. 6 is a signal diagram illustrating a signal without pre-emphasis and a signal with pre-emphasis according to one embodiment of the invention. FIG. 6 is a signal diagram illustrating a signal without pre-emphasis and a signal with pre-emphasis. As may be seen from referring to the signal diagrams in FIG. 6, a signal magnitude is increased for a first bit following a transition in the signal data stream with pre-emphasis. More specifically, evaluating the signal data stream without pre-emphasis, a signal data stream transitions from a logic 0 to a logic 1 at bit periods 2, 5 and 8.

Additionally, bits 3 and 9 are also shown to be a logic 1 though they do not follow a logic 0 signal state because there is no transition. Accordingly, the signal data stream with pre-emphasis shows that the signals at bit periods 2, 5 and 8, the transition bit periods, include an added signal magnitude relative to a non-transition bit. Moreover, in the described embodiment, pre-emphasis is added for transitions from logic 1 to logic 0 (thus, for all transitions). Further, in the described embodiment, a logic 0 is represented by a signal having an equal magnitude but opposite polarity from a logic 1. Accordingly, logic 0 signals following a transition have additional signal magnitude (more negative) than non-transition logic 0 signals. Thus, pre-emphasis refers to increasing a signal magnitude for a first bit following a transition from one logic state to another.

In the example of FIG. 6, pre-emphasis is superimposed to increase a signal magnitude for a specified transition and to decrease a signal magnitude otherwise. More specifically, in one embodiment of the invention where both logic one and logic zero signals are represented with non-zero values, e.g., signals with opposite magnitudes wherein a logic one is represented by a voltage with positive magnitude and a logic zero is represented by a voltage with negative magnitude, pre-emphasis current is added (in terms of magnitude) at every transition. Thus, pre-emphasis current is added also from a transition from a logic one to a logic zero in this embodiment.

FIG. 7 illustrates a signal data stream in a communication channel with and without pre-emphasis. More specifically, FIG. 7 illustrates a signal data stream in a communication channel and the need for pre-emphasis and the positive affects achieved from utilizing pre-emphasis. A differential signal is shown at 190 to illustrate one common channel affect for high data rate transmissions. More specifically, a crossing point shifts back and forth during high data rate communications according to a plurality of factors, including channel conditions and a logic state of a preceding signal bit. Thus, as may be seen at 192, a signal waveform shown at 190 may shift in either direction shown at 192 according to these factors.

A signal waveform shown at 196 represents the same channel effects to a greater scale. As may be seen, the signal wave patterns develop what is known as an eye pattern having an eye height as shown at 198 and an eye width as shown at 200. In general, improved signal transmission characteristics may include increasing the eye height shown at 198 and will include increasing the eye width shown at 200. More generally, the signal waveform shown at 196 represents a signal channel without pre-emphasis. Accordingly, if pre-emphasis is utilized, the signal waveform pattern may represent something more similar to that which is shown by signal waveform 202. As may be seen here, the eye height 204 is increased in contrasting eye height 198, while an eye width 206 is increased in relation to eye width 200. Pre-emphasis as utilized herein may or may not increase the eye height but will increase the eye width.

Based on a specific data rate or channel condition, the specific characteristics of the pre-emphasis may desirably be varied. For example, the placement of a pre-emphasis signal may be varied, as well as a signal magnitude for the pre-emphasis signal. Thus, as is shown in FIG. 6, in the described embodiment of the invention, a pre-emphasis signal is used on a first bit following a transition. The amount of pre-emphasis may be left to design implementation and will be a function the particular channel through which the high data rate stream is to be conducted. One of average skill in the art may utilize the teachings herein to implement a system with pre-emphasis that is appropriate for specific channel conditions. Referring back to FIGS. 5 and 6, the amount of pre-emphasis may be varied by current control logic block 186 according to which current levels are selected within the primary and pre-emphasis current settings transmitted to current selection modules 182 and 184, respectively.

Figure 8:
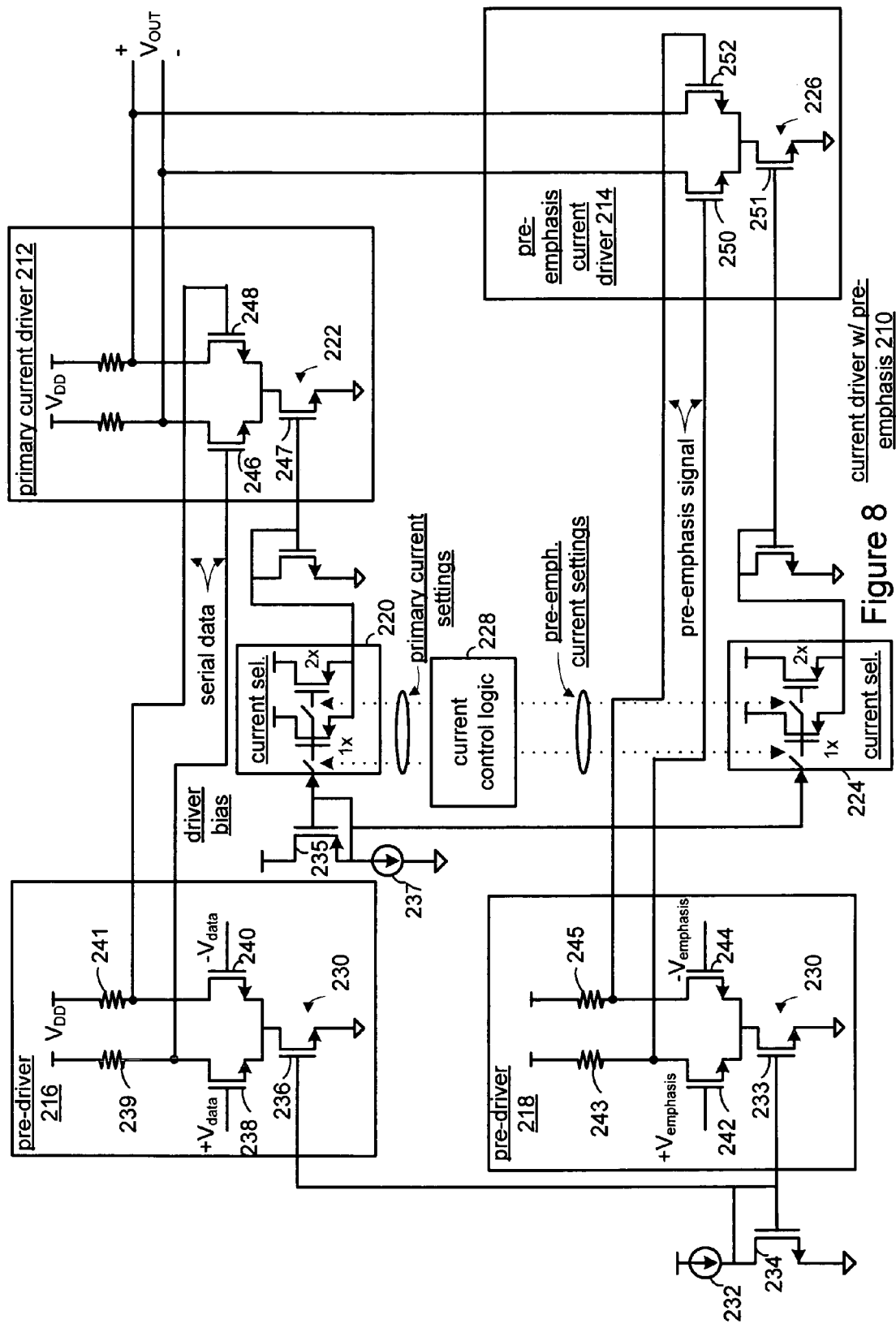
FIG. 8 is a functional schematic diagram of a pre-emphasis and primary current driver formed according to one embodiment of the present invention.

FIG. 8 is a functional schematic diagram of a pre-emphasis and primary current driver formed according to one embodiment of the present invention. A current driver with pre-emphasis 210 includes a primary current driver 212 and a pre-emphasis current driver 214 whose outputs are coupled to produce VOUT. A pair of pre-drivers 216 and 218 provide the input signal to primary current driver 212 (serial data) and pre-emphasis current driver 214 (pre-emphasis signal). A current selection module 220 provides a reference current for a current mirror, shown generally at 222, that sets a current level for primary current driver 212. Similarly, a current selection module 224 provides a reference current for a current mirror, shown generally at 226, that sets a current level for pre-emphasis current driver 214. A current control logic block 228 provides logic to select the reference currents produced by current selection modules 220 and 224. Finally, pre-drivers 216 and 218 are coupled to receive a bias signal from a current mirror 230. The mirror devices of current mirror 230 (i.e., MOSFETs 236 and 233) are scaled to provide a desired bias current level based upon the reference current produced by a current source 232.

More specifically, current source 232 produces a reference current to current mirror 230 to set a bias current level for pre-drivers 216 and 218. MOSFET 236 provides a bias to pre-driver 216 and MOSFET 233 provides a bias to pre-driver 218. MOSFET 234 of current mirror 230 sets the current level for MOSFETs 236 and 233 of current mirror 230 to prompt them to output a specified output voltage whenever an input signal is received at the gates of the input MOSFETs of pre-drivers 216 and 218. In one embodiment of the invention, MOSFETs 236 and 233 are scaled differently and thus provide differing mirror current levels that are proportional in relation to a reference current conducted by MOSFET 234.

Examining pre-driver 216, for example, a differential pair is shown with input devices 238 and 240 coupled to receive a differential voltage input, namely, the input serial data stream $V_{data}$. Accordingly, current source 232 sets the reference current level for current mirror 230 to bias the differential pair comprising devices 238 and 240 to a specified current level whenever an input voltage is received at the gates of devices 238 and 240. An output voltage then results from current conducted through to the resistors 239 and 241 coupled between the drain terminals of input devices 238 and 240 and $V_{DD}$, respectively, and is produced as inputs to primary current driver 212.

Similarly, current mirror 230 sets a bias level for devices 242 and 244 of the differential pair of pre-driver 218. Current source 232 also sets the reference current level for current mirror 230 to bias the differential pair comprising devices 242 and 244 to a specified current level whenever an input voltage ($V_{emphasis}$) is received at the gates of devices 242 and 244. An output voltage then results from current conducted through to the resistors 243 and 245 coupled between the drain terminals of input devices 242 and 244 and $V_{DD}$, respectively, and is produced as inputs to pre-emphasis current driver 214. The input voltage ($V_{emphasis}$) is merely a differential signal produced by pre-emphasis logic 266 of FIG. 9 (below) and more generally from pre-emphasis and transition logic 175 of FIG. 5. One of average skill in the art may readily implement a design to result in which the input voltage ($V_{emphasis}$) produced by pre-emphasis and transition logic 175 is a differential signal as is required by the embodiment of FIG. 8.

Generally, an input signal received at the differential inputs of pre-drivers 216 and 218 appear as inputs to the differential pairs of primary current driver 212 and pre-emphasis current driver 214. The outputs from the drains of pre-drivers 216 and 218 are produced to the gates of the devices of the differential pair of primary current driver 212 and pre-emphasis current driver 214. More specifically, the drains of input devices 238 and 240 (of pre-driver 216) are coupled to the gates of devices 246 and 248 of the differential pair of primary current driver 212. Similarly, the drains of devices 242 and 244 of pre-driver 218 are coupled to the gates of devices 250 and 252 of pre-emphasis current driver 214.

Each of the differential pairs of primary current driver 212 and pre-emphasis current driver 214 are biased by current mirrors 222 and 226, respectively. The current levels of current mirrors 222 and 226 are set by current selection modules 220 and 224, respectively. In one embodiment of the invention, the current level of the primary current driver 212 is set at nine milliamps and the current level of the pre-emphasis current driver 214 is set at +/−one milliamp according to whether the pre-emphasis signal is a logic one or a logic zero. If the pre-emphasis signal is a logic one, +1 milliamps of pre-emphasis current is added. If the pre-emphasis signal is a logic zero, a −1 milliamps of pre-emphasis current is added (1 milliamp is sinked from the output node). The load resistors coupled between the supply and the drains of the differential pairs of the primary and pre-emphasis current drivers are, in one embodiment, set to fifty ohms. Accordingly, $V_{OUT}$ (emphasized) is equal to 500 millivolts and $V_{OUT}$ (de-emphasized) is equal to 400 millivolts. The total current produced by the driver is, in this embodiment, equal to ten milliamps (emphasized) and eight milliamps (de-emphasized).

In the described embodiment of the invention, current selection modules 220 and 224 each comprise a digital-to-analog (DAC) converter having selectable devices that are used to set the reference current level for current mirrors 222 and 226, respectively. The design and use of a DAC for current selection module 220 or 224 as is shown herein, facilitates the selection of output signal magnitudes as needed based on channel conditions. For example, a reference current defined by current selection module 220 results in a corresponding proportional (depending on relative scaling) current being produced by mirror device 247 to set a current level for primary current driver 212. Similarly, a reference current defined by current selection module 224 results in a corresponding proportional current being produced by mirror device 251 to set a current level for pre-emphasis current driver 214.

In the described embodiment of the invention, the DAC forming each of the current selection modules 220 and 224 comprise a plurality of MOSFET devices coupled in parallel that are selectively activated to provide a reference current level. In the current embodiment, the DAC forming the current selection modules 220 and 224 includes two MOSFET devices wherein one is scaled to conduct twice an amount of current of the other device. Accordingly, current control logic block 228 generates a two-bit binary signal to selectively activate either or both MOSFET devices according to the desired amount of bias current level. As may further be seen, current selection modules 220 and 224 are selectively coupled to receive a bias signal that is set by a current mirror reference device 235 and a current mirror current source 237 that specifies the reference current level.

Thus, based on the value of the binary signal set by current control logic block 228, the amount of current for the DAC used as current selection module 220 and 224 can be either 0, 1×, 2× or 3×. The actual value of "x" depends upon design requirements and may readily be determined by one of average skill in the art implementing the teachings herein. More generally, the value of "x" is a function of device scaling. Thus, the current selection module, responsive to a two-bit binary signal received by the pre-emphasis logic block, couples at least one MOSFET device to provide a reference current for either current mirror 222 or current mirror 226 for the primary current driver 212 and the pre-emphasis current driver 214, respectively. As is known by one of average skill in the art, for each of these circuit elements comprising a current mirror, an amount of current or bias signal provided to a reference device, here, the left hand device of the current mirror, is reflected in a corresponding mirror device. Thus, by utilizing the DACs with selectable devices, the reference current may readily be adjusted to result in a corresponding current level in the mirror devices coupled thereto.

An additional aspect of the present embodiment of the invention relates to the generation of pre-emphasis. In the described embodiment of the invention, current control logic block 228 continually generates a driver bias signal to current selection module 220 to prompt module 220 to produce a corresponding reference signal to enable primary current driver 212 to drive a current whenever an input data signal is presented at its gate terminals.

Current selection module 224 also provides a pre-emphasis current for every bit, in the described embodiment of the invention, but the polarity of the pre-emphasis current depends upon a transition in a logic state of a data bit in relation to a prior data bit of a received data stream. Stated differently, pre-emphasis current driver 214 provides a positive current to be added to the primary current driver 212 output whenever a logic 1 data bit follows a logic 0 data bit (or vice versa in the described embodiment) in a data stream that is being driven by primary current driver 212 and a negative current for non-transition bit periods to reduce the output current level. Accordingly, for example of one embodiment, primary current driver 212 may always produce a steady 9 milliamps while pre-emphasis current driver 214 produces either a +1 or a −1 milliamps to result in a total output current that is equal to either 10 or 8 milliamps, respectively. Thus, in one embodiment of the invention, positive pre-emphasis current is only added upon a transition from a logic 0 to a logic 1. In another embodiment, positive pre-emphasis current is also added for transitions from logic 1 to logic 0 (i.e., for all transitions).

FIG. 9 illustrates pre-emphasis and transition logic for determining and generating a pre-emphasis control signal as well as a synchronized serial data stream. Referring to FIG. 9, the pre-emphasis and transition logic 175 includes an inverter 260 that is coupled to receive and invert a received serial data stream. An inverted serial data stream is then produced to a delay element 262 that introduces a one bit period delay. The output of delay element 262 is produced to a clocked flip flop 264 to synchronize $V_{data}$ and $V_{emphasis}$. The output of flip flop 264 is sent to pre-driver 174. An inverter 268 is coupled to receive and invert the serial data stream and to produce the inverted serial data stream to a second inverter 270 that re-inverts the data stream. The two inverters serve to utilize a small amount response time that corresponds with response times of inverter 260 and delay element 262 so as to maintain synchronization of the high rate serial data stream with the inverted and delayed serial bit stream. The output of inverter 270 (the serial data stream) is then produced to clocked flip flop 272 to synchronize $V_{data}$ and $V_{emphasis}$. The output of flip flop 272 is then sent to pre-driver 172. As described before, a logic one results in a positive magnitude current being added to the primary current output while a logic zero results in a negative magnitude current being added to the primary current output in the described embodiment of the invention. As may also be seen, the output of flip flop 272 is also produced externally as the serial data (that is input to the gates of pre-driver 172 of FIG. 5 and pre-drivers 216 and 218 of FIG. 8). While FIG. 9 shows single-ended operation, it is understood that the circuitry may readily be adapted for differential application also.

FIG. 10A shows a truth table detailing the operation of the logic circuitry of FIG. 9 in combination with the circuitry of FIG. 8. Pre-emphasis current to increase a signal magnitude (whether a positive signal representing one logic state or a negative signal representing a different logic state) whenever the serial data and the delayed and inverted serial data both are equal to a logic one, as shown in the row labeled "pre-emphasis". The "y" reflects that a signal magnitude is being increased with pre-emphasis while an "n" reflects that a signal magnitude is being decreased. Generally, the truth table of FIG. 10A illustrates that the pre-emphasis logic 266 in pre-emphasis and transition logic 175 generates a pre-emphasis signal whenever a transition occurs from a logic zero to a logic one. FIG. 10B is similar to FIG. 10A except that it illustrates logic for generating a pre-emphasis current to increase a signal magnitude whenever a transition occurs instead of only for transitions to a logic one from a logic zero.

In the described embodiment of the invention, an equal amount of current is added or subtracted at every bit period to either increase or decrease a signal magnitude. In an alternate embodiment of the invention, a logic zero results in no current being added. The alternate embodiment has the drawback, however, of requiring a current level to be instantaneously developed to add to the primary current whenever the pre-emphasis signal is to be applied. Developing such instantaneous current is difficult. Thus, in the described embodiments, the primary current is set to a mid point between the current level with pre-emphasis and the current level without pre-emphasis. The pre-emphasis current level may then merely be added or subtracted to achieve the desired result.

FIG. 11 is a flowchart illustrating a method for generating a pre-emphasis current. Initially, a current control logic block transmits pre-emphasis current setting signals to a first current selection module (to a pre-emphasis current setting module) and primary current setting signals to a second current selection module (primary current setting module) to set the pre-emphasis and primary current levels (step 274), respectively. Thereafter, a pre-emphasis and transition logic block monitors an input data stream and detects that a transition has occurred (step 272). Upon detecting that a transition has occurred, the transition and pre-emphasis logic block transmits a pre-emphasis signal having a specified value to the first current selection module. The first current selection module then generates a corresponding pre-emphasis current for the transition bit.

In the described embodiment of the invention, if a transition has not occurred, the pre-emphasis and transition logic block transmits a pre-emphasis signal having a second specified value. In the described embodiment of the invention, a pre-emphasis signal is transmitted for every bit period. If the pre-emphasis bit has a first logic value, the pre-emphasis current block generates a positive current for summing with the primary current. If the pre-emphasis bit has a second logic value, the pre-emphasis current block generates a negative current for summing with the primary current. If a transition is detected, a positive current is generated for summing with the primary current (step 278). If a transition has not occurred, a negative pre-emphasis current is generated for summing with the primary current (step 280). Finally, the invention includes summing a primary current level with a pre-emphasis current level at a Tx line driver output (step 282) to produce an output current.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A transmitter comprising:
    a primary driver circuit configured to produce an output data stream having a plurality of bits;
    a pre-emphasis driver circuit configured to increase a signal magnitude of a first bit of the plurality of bits, when the first bit has a different signal magnitude than a second adjacent bit of the plurality of bits; and
    pre-emphasis and transition logic circuit coupled to the primary driver circuit and to the pre-emphasis driver circuit, the pre-emphasis and transition logic circuit comprising a flip-flop and a one-bit delay circuit coupled to the flip-flop, wherein the one-bit delay circuit is coupled to receive inverted serial input data, and wherein an output of the flip-flop is coupled to the pre-emphasis driver circuit.

2. The transmitter of claim 1 wherein each bit of the plurality of bits represents a logical one or a logical zero.

3. The transmitter of claim 2 wherein the signal magnitude is increased every time a bit of the plurality of bits transitions from logic zero to logic one or from logic one to logic zero.

4. The transmitter of claim 3 wherein when the bit transitions from logic one to logic zero, the signal magnitude is more negative than a non-transition logic zero signal magnitude.

5. The transmitter of claim 3 wherein when the bit transitions from logic zero to logic one the signal magnitude is more positive than a non-transition logic one signal magnitude.

6. The transmitter of claim 5 wherein when the bit transitions from logic zero to logic one, positive pre-emphasis current is generated.

7. The transmitter of claim 1 wherein the primary driver circuit has selectable primary drive currents.

8. The transmitter of claim 1 wherein the pre-emphasis driver circuit has selectable pre-emphasis drive currents.

9. A transmitter line driver comprising:
   a primary current driver circuit configured to produce an output data stream with a selectable primary current level, the output data stream comprising a plurality of bits;
   a sum node coupled to the primary current driver circuit;
   a pre-emphasis current driver circuit coupled to the sum node, the pre-emphasis current driver providing additional current when a bit value of a first bit of the plurality of bits transitions to a different bit value of a second bit of the plurality of bits; and
   pre-emphasis and transition logic circuit coupled to the primary current driver circuit and to the pre-emphasis current driver circuit, the pre-emphasis and transition logic circuit comprising:
      a first flip-flop receiving serial data and coupled to the primary current driver circuit; and
      a one bit delay circuit coupled to a second flip-flop and receiving inverted serial data, wherein the second flip-flop is coupled to the pre-emphasis current driver circuit.

10. The transmitter line driver of claim 9 further comprising:
    a first current selection circuit coupled to the primary current driver circuit and configured to set the selectable primary current level; and
    a second current selection circuit coupled to the pre-emphasis current driver circuit and configured to set a current level for the additional current.

11. The transmitter line driver of claim 10 wherein the serial data is sent to the first flip-flop via two inverters and the inverted serial data is created using an inverter.

* * * * *